US006303528B1

(12) United States Patent
Speit et al.

(10) Patent No.: US 6,303,528 B1
(45) Date of Patent: Oct. 16, 2001

(54) GLASS FOR RIGID DISK SUBSTRATES

(75) Inventors: Burkhard Speit; Gerhard Westenberger, both of Mainz (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/574,360

(22) Filed: May 19, 2000

Related U.S. Application Data

(62) Division of application No. 09/238,657, filed on Jan. 26, 1999, now Pat. No. 6,162,751.

(30) Foreign Application Priority Data

Jan. 27, 1998 (DE) .............................. 198 02 919

(51) Int. Cl.⁷ .......................... C03C 3/085; C03C 3/087; C03C 3/091; C03C 3/093; C03C 3/095
(52) U.S. Cl. ............................. 501/69; 501/57; 501/63; 501/64; 501/66; 501/67; 501/70; 428/64.2; 428/64.3; 428/65.3; 428/65.6; 428/426; 428/694 ST
(58) Field of Search ................................. 501/57, 59, 63, 501/64, 66, 67, 69, 70, 72; 428/64.2, 64.3, 65.3, 65.6, 426, 694 ST

(56) References Cited

U.S. PATENT DOCUMENTS 5,804,520 * 9/1998 Morinaga et al. .................. 501/4
5,895,767 * 4/1999 Yamaguchi et al. ............... 501/72
5,900,296 * 5/1999 Hayashi et al. .................... 501/69
5,997,977 * 12/1999 Zou et al. ......................... 428/64.1
6,001,445 * 12/1999 Itoh et al. ......................... 428/64.1
6,040,029 * 3/2000 Yamamoto et al. ............... 428/64.1

FOREIGN PATENT DOCUMENTS 01-167245 * 6/1989 (JP).
03-040933 * 2/1991 (JP).
10-025129 * 1/1998 (JP).

* cited by examiner

Primary Examiner—David R Sample
(74) Attorney, Agent, or Firm—Michael J. Striker

(57) ABSTRACT

The glasses used for making rigid disk substrates have the following composition (in % by weight based on oxides): $SiO_2$, 40 to 50.8; $Al_2O_3$, 5 to 20; $B_2O_3$, 0 to 5; $Li_2O$, 0 to 10; $Na_2O$, 0 to 12, with the proviso that $Li_2O+Na_2O$, 5 to 12; $K_2O$, 0 to 5; $MgO$, 0 to 20; $CaO$, 0 to 6, with the proviso that $MgO+CaO$, 4 to 20; $SrO+BaO$, 0 to 10; $ZrO_2$, 0 to 5; $TiO_2$, 0 to 5; $CeO_2$, 0 to 1; $La_2O_3$, 0 to 10; $Fe_2O_3$, 0 to 10; $Nb_2O_5$, 0 to 10; $V_2O_5$, 0 to 15, with the proviso that $TiO_2+ZrO_2+La_2O_3+Fe_2O_3+Nb_2O_5+V_2O_5 \geq 18.7$; $As_2O_3+Sb_2O_3+F$. 0,1 to 1. These glasses also fulfill the following inequality formulae (1):

$$(E/\rho)\cdot+3{,}500\ R>38.5\ \text{and}\ 1000\ R>1 \qquad (1),$$

wherein R represents the relaxation rate of the glass and $E/\rho$ represents specific elasticity modulus of the glass measured in $GPA*cm^3/g$.

6 Claims, No Drawings

GLASS FOR RIGID DISK SUBSTRATES

CROSS-REFERENCE TO RELATED APPLICATION

This is a divisional of U.S. patent application, Ser. No. 09/238,657 filing date Jan. 26, 1999, now U.S. Pat. No. 6,162,751.

BACKGROUND OF THE INVENTION

1. Field of the Invention

The present invention relates to glass or glass material for making rigid disk substrates and rigid disks substrates made therefrom.

2. Prior Art

Glass has the advantages, among others, that it has less surface roughness and is planar in comparison to metals, such as aluminum or metal alloys, and thus is used as a substrate for a data recording medium or carrier (rigid disk). These substrate glasses must be able to stand increased chemical, thermal and mechanical loads and stresses in use. Thus they experience high temperatures with rapid cooling rates during coating (for example by cathode sputtering). High mechanical loads occur when they are used as rigid disks, e.g. building up clamping stresses on a rotation axis of up to 100 N/mm$^2$ and additional stresses by centrifugal forces in operation at high rotation speeds of currently 3,500 to 10,000 rev per minute. These loads can only be withstood by 0.25 to 3.0 mm thin glasses when they are pre-stressed. Since the increase of the mechanical load carrying ability by means of thermal pre-stressing is limited to glasses with a minimum thickness of 3 mm, glasses must be chemically pre-stressed for the above-described purpose. Significantly they are pre-stressed by ion exchange in a salt bath under the transformation temperature $T_g$, i.e. they have sufficient suitable ions such as Li$^+$ and/or Na$^+$ ions for the exchange. Besides the surface planarity the chemical resistance of the substrate glass is of significance for their function as rigid disks, when the write-read head slides on an air cushion over the rotating rigid disk with a spacing of currently about 50 nm. This spacing must be maintained for an unobjectionable operation. However it is reduced when the surface of the fixed disk substrate is unstable to atmospheric influences and a chemical attack on the surface makes the surface rough prior to coating or when the surface looses its adherence properties for the applied coating sequence because of atmospheric influences and it loosens because of that. Thermal expansion properties of the glasses used for making rigid disk substrates are also important and should not be too different from those of the coating material (e.g. co-alloys with thermal expansion coefficients $\alpha_{20/300} \geq 12 \times 10^{-6}/K$) and above all not to different from that of the clamping material and spindle material of the operating mechanism (with $\alpha_{20/300} \geq 12 \times 10^{-6}/K$), in order to avoid stresses and strains.

The lowering of the glide height of the read-write head over the rigid disk is a prerequisite for increasing the information density and read/write speed. A reduced travel or slide height allows an increased write density and a higher rotation speed of the fixed disk.

The travel/slide height cannot be arbitrarily reduced, because of fluctuations in the drive system during the rotation of the rigid disk, which are excited by strong location variations in air currents or turbulence and thrust fluctuations which express themselves in a sort of fluttering motion of the rigid disk. When the travel/slid height of the read/write head is to be reduced, these deviations from the rest position lead to a loss of correlation of the read/write head to the information content of the spots on the rigid disk ("runout") or it also to a collision with the fixed disk ("head crash").

In order to avoid this and to permit a rotation speed of more than 10,000 rev/min, the rigid disk needs a high shape stability, which currently glasses and glass-ceramics have not been able to provide for glasses used for rigid disks.

A composite material composed of Al—B—C is known as a material for these high rotation speeds (IDEMA, Alternative Substrates III (San Jose, Calif. Sep. 5, 1995), pp. 55 to 60, D. J. Perettie, et al, "The Alternate Alternative Substrate—"Chemically Strengthened" Aluminum"). This composite material has low density, a high strength and a very high specific elasticity modulus $E/\rho$. The stiffness of a rigid disk, i.e. the resistance to bending, is proportional to $(E/\rho)*d^3$, wherein d is the thickness of the rigid disk. The above-mentioned material may be polished to the required surface quality with a roughness value (RMS-average) of less than 0.4 nm however only with great effort. Above all the making of rigid disks from this material is very expensive because of its great abrasion resistance.

A composite disk made from glass and a viscoelastic material, in which the fluctuations are damped by the viscotelastic material, for example plastic material, such as synthetic rubber, or a polyester, polyurethane or polyamide, is described in WO 96/04651. Disadvantageously the disk made in this manner is very expensive and the viscoelastic material becomes fatigued (embrittled) after some time and then can no longer operate as a fluctuation damping device. Furthermore the plastic material used can out-gas, when the magnetic coating is deposited at higher substrate temperatures by cathode sputtering, and because of that the quality of the applied coating is impaired.

SUMMARY OF THE INVENTION

It is an object of the present invention to provide glasses for making disk substrates that are suitable for rotation speeds greater than 10,000 rpm, i.e. glasses, which have not only the required properties for conventional disk substrates but in addition have sufficient shape stability for the higher rotations speeds.

According to the invention glass used to make the disk substrates has the following composition (in % by weight based on oxides)

| | |
|---|---|
| SiO$_2$ | 40 to 60 |
| Al$_2$O | 5 to 20 |
| B$_2$O$_3$ | 0 to 5 |
| Li$_2$O | 0 to 10 |
| Na$_2$O | 0 to 12 |
| with the proviso that Li$_2$O + Na$_2$O | 5 to 12 |
| K$_2$O | 0 to 5 |
| MgO | 0 to 20 |
| CaO | 0 to 6 |
| with the proviso that MgO + CaO | 4 to 20 |
| SrO + BaO | 0 to 10 |
| Zr$_2$O | 0 to 5 |
| TiO$_2$ | 0 to 5 |
| CeO$_2$ | 0 to 1 |
| La$_2$O$_3$ | 0 to 10 |
| Fe$_2$O$_3$ | 0 to 10 |
| Nb$_2$O$_5$ | 0 to 10 |
| V$_2$O$_5$ | 0 to 15 |
| with the proviso that TiO$_2$+ ZrO$_2$ + | $\geq 8$ |

-continued

| | |
|---|---|
| $La_2O_3 + Fe_2O_3 + Nb_2O_3 + V_2O_5$ $As_2O_3 + Sb_2O_3 + F$ | 0.1 to 1, | and this glass behaves according to the inequalities for the numerical values of the relation speed R and the specific elasticity modulus measured in $GPA*cm^3/g$ given hereinbelow as inequality formulae (1). Glasses according to the invention having the above-described composition are referred to in the following as group A glasses.

According to the invention glass used to make the disk substrates can also have the following composition (in % by weight on a basis of the oxides present):

| | |
|---|---|
| $SiO_2$ | 10 to 30 |
| $Al_2O$ | 0 to 5 |
| $B_2O_3$ | 0 to 8 |
| $Li_2O$ | 0 to 8 |
| $Na_2O$ | 1 to 10 |
| with the proviso that $Li_2O + Na_2O$ | 5 to 10 |
| $K_2O$ | 0 to 3 |
| MgO | 0 to 12 |
| CaO | 0 to 15 |
| with the proviso that MgO + CaO | 10 to 15 |
| SrO + BaO | 0 to 8 |
| $Zr_2O$ | 0 to 8 |
| $TiO_2$ | 10 to 25 |
| $La_2O_3$ | 0 to 10 |
| $Nb_2O_5$ | 10 to 18 |
| $V_2O_5$ | 0 to 20 |
| $CeO_2$ | 0 to 1 |
| $As_2O_3 + Sb_2O_3 + F$ | 0.1 to 1, | and this glass behaves according to the inequalities for the numerical values of the relation speed R and the specific elasticity modulus measured in $GPA*cm^3/g$ given hereinbelow as inequality formulae (1). These latter glasses are referred to in the following as group B glasses.

It was found tat rigid disks made from a glass whose specific elasticity modulus and its relaxation rate exceed the limits mentioned in the following, i.e. satisfy the following described inequalities or inequality formulae, are sufficiently form stable for the above-mentioned high rotation speeds. That means that only slight deviations occur and the resulting disks have good behavior in regard to fluctuations, i.e. the fluctuation amplitudes are reduced, or even completely suppressed, when fluctuations are excited.

The inequality formulae are as follows:

$$(E/\rho) \cdot +3,500 \ R > 38.5 \text{ and } 1000 \ R > 1. \tag{1}$$

The values of the elasticity modulus E and the density $\rho$ are given in Gpa and in $g/cm^3$ respectively used for the specific elasticity modulus $E/\rho$. The $(E/\rho)\cdot$ gives by convention the numerical value without units.

The relaxation rate R is a suitable measure for the speed of build up of the fluctuation energy. The term "relaxation rate" here means the rate at which the amplitude A of a fluctuation or oscillation, $\cos(\omega t)$, drops to a value A.

$$A = A_0 \cdot e^{-Rt} \cdot \cos(\omega t) \tag{2}$$

Thus R results from the reciprocal of the number of fluctuations or oscillations, until the fluctuation amplitude drops to 1/e. The manner in which R is measured is described in connection with the following example.

The excitation of oscillations or fluctuations in a rigid disk occurs with increasing rotation speed (revolution number) D (rpm) until the revolutions per unit time reach a rotation speed at which resonance occurs, at which point the amplitude of the fluctuations or oscillations reaches a maximum and a standing wave is set up in the disk which leads to the so-called "disk flutter" This resonance is excited at a disk rotation speed, D, which satisfies the condition $$f_0 = N*D/60$$

wherein N is a whole number and the number of standing waves and $f_0$ is an eigenfrequency of the disk. It depends on the elasticity modulus E and the density $\rho$ of the disk material and of course is proportion to $(E/\rho)^{1/2}$.

Glasses suitable for the above-described applications that fulfill both inequalities have compositions of ingredients listed hereinabove in percent by weight based on their oxide content.

The glasses of group A above are alkaline earth aluminosilicate glasses that have a comparatively small elasticity modulus, however comparatively low density and great relaxation rate R so that they fulfill the above-given inequalities.

The increase of the alkaline earth content, particularly the content of CaO and MgO, above the stated range in these group A glasses causes the elasticity modulus to increase, but at the same time makes good chemical pre-stressing in ion exchange of $Li_2O$-containing and/or $Na_2O$-containing glass difficult in a potassium salt bath (for example at 400° C. with an exchange time of 4 h). The allowed optional KO content up to a maximum of 5% assists the chemical pre-stressing process in $Li_2O$-containing and/or $Na_2O$-containing glass with 5 to 12% $Li_2O + Na_2O$ (the greater the exchange depth, the higher the pre-stressing in the surface layers). Similarly the allowed $Al_2O_3$ content of up to 20% also assists the pre-stressing. A greater proportion of K-O weakens the action of the chemical pre-stressing process and simultaneously the chemical resistance of the glass. Higher proportions of $Al_2O_3$ have a negative effect on the melting of the raw material.

The sum of the optional components $TiO_2$, $ZrO_2$, $La_2O_3$, $Fe_2O_3$, $Nb_2O_3$ and $V_2O_5$ present should be at least 8% by weight, so that the glass of these systems has a sufficient E-modulus.

The use of $TiO_2$ and $ZrO_2$ up to a maximum o 5% by weight to increase the E-modulus guarantees good production characteristics. Higher concentrations of these species lead to crystallization of the glass melt during processing.

Furthermore the addition of $La_2O_3$, $Fe_2O_3$, $Nb_2O_3$ and $V_2O_5$ is limited to 10 or 15% ($V_2O_5$) respectively, since the small highly charged ions, built into the network of the glass, indeed increase the elastic modulus, but also increase the density, lower the chemical resistance and increase the tendency to crystallize. Moreover $TiO_2$ and $Fe_2O_3$ are counted, among others, as expensive raw materials.

Using the $TiO_2$ and $Nb_2O_3$ ingredients or the optional ingredients, $La_2O_3$ and $V_2O_5$, in greater proportions, above all, causes an increase in the elasticity modulus in the glasses of group B. Also these glasses are chemically pre-stressable surprisingly in spite of comparatively high alkaline earth concentrations based on their minimized total amount of $Na_2O$ and $Li_2O$. These glasses also contain SrO and BaO, which improves both the melting properties and also the high thermal expansion required for their applications with reduced alkali content. Use of $Al_2O_3$ as optional ingredient improves the chemical resistance.

The glasses of both groups contain the refining agents $As_2O_3$, $Sb_2O_3$ and fluoride to improve the glass quality. The glasses can also contain $CeO_2$ for this purpose.

EXEMPLARY EMBODIMENTS

Table I tabulates the compositions of several examples of glass according to the invention as well as their essential properties.

The glasses were smelted using conventional raw materials.

Their high chemical resistance is documented by giving the acid resistance glass according to ISO 8424. The glasses have an acid resistance class of 2 or better. These glasses show hardly any salt efflorescence under a microscope with 40-fold magnification in a climate chamber test in which they were exposed for a week at 80° C. and 80% relative humidity and tested for changes on the surface (alkali carbonate formation).

The thermal expansion coefficient $\alpha_{20/300}$ of the glasses amounts to from $6 \times 10^{-6}/K$ to $9 \times 10^{-6}/K$ and thus is sufficiently close to the thermal expansion coefficient of the coating material for the disk.

Glass samples having dimensions of from 2 mm×7 mm×53 mm were made and left in a KNO3 bath at 400° C. for 4 h to test or establish the chemical pre-stressability. A compressive stress zone is formed, whose thickness (see Table I) is determined in a manner described in the following.

The glass sample is observed under a polarizing microscope at a wavelength of 546 nm. The sample treated by ion exchange is placed under a compressive stress over its entire surface and in the interior under a tensile stress because of weight considerations. To measure the stress the sample is placed between two crossed polarizers. The stress applied to the sample causes a brightening in the field of the microscope because of stress double refraction of the beam passing through the microscope. The transition between tensile and compressive stress (neutral zone $0^{th}$ order) is detected as a broad dark strip in the microscope field. The spacing of the $0^{th}$ order to the edge of the same is a measure of the thickness of the compressive stress zone.

Table I also includes the parameters required for the above inequalities (1) according to the invention: the elasticity modulus in Gpa and the relaxation rate R for room temperature.

The relaxation rate R is measured by means of a commercial apparatus for production and evaluation of fluctuations or oscillations according to the methods described in the following paragraph.

A rectangular bar with dimension 5 mm×10 mm×150 mm (each ±0.1) with finely ground surfaces rests with one of its 10 mm×150 mm surfaces on two parallel 0.15 mm diameter steel wires under tension so that the 5 mm×10 mm end surfaces of the bar have a spacing of 33.6 mm to the closest of the two steel wires arranged perpendicular to the longitudinal axis of the bar. The steel wires are under the fluctuation node point of the fundamental oscillation. An excitation wire is placed on the center of one of the 5 mm×10 mm end faces at an angle of about 45° to the longitudinal axis of the bar while a receiving wire is placed on the center of the other 5 mm×10 mm end face at the same angle. The excitation and receiveing wire are each 0.10 mm thick. Both wires are connected with an apparatus that can produce and analyze oscillations or fluctuations (here the Elastomat 1.024, Manufacturer: Institute Dr. Förster). The excitation wire is excited by this apparatus with longitudinal fluctuations with an eigenfrequency of the fundamental vibration of the bar and excites for its part bending fluctuations in the bar. The resonance fluctuations excited in the probe freely decay or die away in a decay process so that the fluctuation or oscillation amplitude falls off exponentially. The receiving wire transmits the fluctuations or oscillations excited in the bar after switching off the exciting oscillations to the device which measures time dependence of the oscillations excited in the bar, i.e. the number and amplitude of the oscillations or fluctuations. The relaxation rate R or its logarithmic decrement is characteristic of the number of oscillations, which are formed, until their amplitude decays to the $e^{th}$par,.

The values of R for the respective materials, i.e. here the glass materials with the respective compositions, are obtained with the common commercial apparatus for Production and analysis of fluctuations and oscillations after halting the measurements on the various test samples with the test apparatus.

Also the elasticity modulus given is determined with the above-mentioned apparatus.

The elasticity modulus and relaxation rate was determined in non pre-stressed samples.

TABLE I

COMPOSITION (WEIGHT % ON OXIDE BASIS) AND ESSENTIAL PROPERTIES OF THE GLASSES ACCORDING TO THE INVENTION

|  | 1 | 2 | 3 | 4 | 5 | 6 |
|---|---|---|---|---|---|---|
| $SiO_2$ | 58.5 | 50.8 | 44.3 | 27.4 | 20.4 | 15.1 |
| $Al_2O_3$ | 14.0 | 8.5 | 13.75 | — | — | 2.0 |
| $B_2O_3$ | — | 2.2 | — | 4.0 | — | 6.3 |
| $Li_2O$ | 5.8 | — | — | 6.5 | — | 5.2 |
| $Na_2O$ | — | 10.0 | 5.1 | 1.1 | 8.15 | 1.4 |
| $K_2O$ | 1.0 | 3.0 | — | — | — | — |
| MgO | — | 4.0 | 16.65 | 10.5 | — | — |
| CaO | 4.2 | 2.0 | — | 3.6 | 12.1 | 10.2 |
| SrO+BaO | 7.5 | — | — | 5.3 | — | 0.8 |
| $ZrO_2$ | 2.1 | — | — | 5.2 | 1.95 | — |
| $TiO_2$ | 1.8 | 4.2 | — | 11.2 | 19.75 | 24.2 |
| $CeO_2$ | — | 0.2 | — | — | 0.2 | 0.2. |
| $La_2O_3$ | — | 8.0 | — | 9.7 | 5.1 | — |
| $Fe_2O_3$ | — | — | 8.0 | — | — | — |
| $Nb_2O_3$ | 4.1 | 6.5 | — | 15.2 | 12.65 | 15.5 |
| $V_2O_5$ | — | — | 12.0 | — | 19.55 | 18.6 |
| $As_2O_3$ | 1.0 | 0.5 | — | — | 0.15 | — |
| $Sb_2O_3$ | — | — | 0.2 | 0.2 | — | 0.25 |
| F | — | — | — | 0.1 | — | 0.25 |
| E(Gpa) | 85 | 96 | 131 | 116 | 137 | 142 |
| $\rho(g/cm^2)$ | 2.53 | 2.81 | 3.06 | 3.40 | 3.75 | 3.6 |
| R | 0.003 | 0.0035 | 0.0015 | 0.002 | 0.0015 | 0.0020 |
| $(E/\rho)^*$ + 3,500 R | 44.1 | 46.45 | 48.0 | 41.1 | 41.75 | 46.5 |
| $\alpha_{20/300}$ ($_{10}{-6}/K$) | 6.0 | 8.1 | 6.6 | 8.6 | 8.3 | 7.9 |
| SR | 1 | 1 | 1 | 2 | 2 | 2 |
| Thickness of compression zone (μm) | 27 | 43 | 21 | 32 | 45 | 23 |

When a glass has all the discussed properties, it is suitable for use for making a disk substrate for high rotation speeds.

Thus for example the glass of composition (% by weight on an oxide basis) $SiO_2$, 52.9; $Al_2O_3$, 21.1; MgO, 26.0; with an elasticity modulus E of 129 Gpa, a density ≯ of 2.91 g/cm³ and a relaxation rate R of $0.9*10^{-3}$ fulfills the above-described inequality relationships or formulae (1) and thus has sufficient shape stability, however it cannot be chemically pre-stressed, and it is only made into thin raw glass panels with difficulty, since it easily crystallizes. It is thus unsuitable for making disk substrates.

In contrast the glasses that have both E and R, which satisfy the above-mentioned inequality formulae and also have compositions within the composition ranges as stated hereinabove according to the invention, have the other properties required for making disk substrates suitable for rotation speeds of greater than 10,000 rpm.

They have a high shape stability. Fluctuation amplitudes remain small, fluctuation energies decay rapidly. Because of the reduced deformation of the disks during rotation, as at high rotation speed, the flight height, which corresponds to about twice the slide height, of the read/write head drops to 50 nm and/or the rotation speed of the disk can be increased to more than 10,000 rpm. Since the increase of rotation speed causes an increase in the temperature of the drive motor and an increase in air turbulence caused by the so-called drive, safety considerations limit the rotation speed to less than 15,000 rpm.

They are chemical pre-stressable, whereby sufficient compression zones are produced. Because of that their mechanical load increases.

They have a high chemical resistance, especially a high acid resistance.

Their thermal expansion properties adjusted so that $\alpha_{20/300} \geq 6 \times 10^{-6}$ /K are sufficient for clamping materials, drive shafts and coating materials.

They are sufficiently polishable. They can be worked to a microscopic roughness of less than 0.4 nm. They have a homogeneous material typical erosion rate for lapping, grinding and polishing, namely 10 to 20 μm/min for lapping, 20 to 40 μm/min for grinding and about 1 μm/min for polishing. They also have an outstanding surface quality, especially planarity.

The disclosure in German Patent Application 198 02 919.5 of Jan. 27, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in glasses or glass materials for rigid disk substrates, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A glass for making rigid disk substrates having the following composition (in % by weight based on oxides):

| | |
|---|---|
| $SiO_2$ | 40 to 50.8 |
| $Al_2O_3$ | 5 to 20 |
| $B_2O_3$ | 0 to 5 |
| $Li_2O$ | 0 to 10 |
| $Na_2O$ | 0 to 12 |
| with the proviso that $Li_2O + Na_2O$ | 5 to 12 |
| $K_2O$ | 0 to 5 |
| MgO | 0 to 20 |
| CaO | 0 to 6 |
| with the proviso that MgO + CaO | 4 to 20 |
| SrO + BaO | 0 to 10 |
| $ZrO_2$ | 0 to 5 |
| $TiO_2$ | 0 to 5 |
| $CeO_2$ | 0 to 1 |
| $La_2O_3$ | 0 to 10 |
| $Fe_2O_3$ | 0 to 10 |
| $Nb_2O_5$ | 0 to 10 |
| $V_2O_5$ | 0 to 15 |
| with the proviso that $TiO_2 + ZrO_2 + La_2O_3 + Fe_2O_3 + Nb_2O_5 + V_2O_5$ | $\geq 8$ |
| $As_2O_3 + Sb_2O_3 + F$ | 0.1 to 1, | wherein said glass satisfies the following inequality formulae (1):

$$(E/\rho) \cdot +3{,}500\ R > 38.5 \text{ and } 1000\ R > 1 \qquad (1),$$

wherein R represents the relaxation rate of the glass and $E/\rho$ represents specific elasticity modulus of the glass measured in $GPA*cm^3/g$.

2. The glass as defined in claim 1, having an acid resistance of at least 2 according to ISO 8424 and a thermal expansion coefficient $\alpha_{20/300} \geq 6 \times 10^{-6}$/K.

3. A rigid disk substrate for a rigid disk operable at rotation speeds greater than 10,000 rpm, said rigid disk substrate comprising the glass as defined in claim 1.

4. A method of making a rigid disk substrate for a rigid disk operable at rotation speeds greater than 10,000 rpm, said method comprising the step of making the rigid disk substrate from a glass having the following composition (in % by weight based on oxides):

| | |
|---|---|
| $SiO_2$ | 40 to 50.8 |
| $Al_2O_3$ | 5 to 20 |
| $B_2O_3$ | 0 to 5 |
| $Li_2O$ | 0 to 10 |
| $Na_2O$ | 0 to 12 |
| with the proviso that $Li_2O + Na_2O$ | 5 to 12 |
| $K_2O$ | 0 to 5 |
| MgO | 0 to 20 |
| CaO | 0 to 6 |
| with the proviso that MgO + CaO | 4 to 20 |
| SrO + BaO | 0 to 10 |
| $ZrO_2$ | 0 to 5 |
| $TiO_2$ | 0 to 5 |
| $CeO_2$ | 0 to 1 |
| $La_2O_3$ | 0 to 10 |
| $Fe_2O_3$ | 0 to 10 |
| $Nb_2O_5$ | 0 to 10 |
| $V_2O_5$ | 0 to 15 |
| with the proviso that $TiO_2 + ZrO_2 + La_2O_3 + Fe_2O_3 + Nb_2O_5 + V_2O_5$ | $\geq 8$ |
| $As_2O_3 + Sb_2O_3 + F$ | 0.1 to 1, | wherein said glass satisfies the following inequality formulae (1):

$$(E/\rho) \cdot +3{,}500\ R > 38.5 \text{ and } 1000\ R > 1 \qquad (1),$$

wherein R represents the relaxation rate of the glass and $E/\rho$ represents specific elasticity modulus of the glass measured in $GPA*cm^3/g$.

5. A glass for making rigid disk substrates having the following composition (in % by weight based on oxides):

| | |
|---|---|
| $SiO_2$ | 40 to 50.8 |
| $Al_2O_3$ | 5 to 20 |
| $B_2O_3$ | 0 to 5 |

-continued

| | |
|---|---|
| Li$_2$O | 0 to 10 |
| Na$_2$O | 0 to 12 |
| with the proviso that Li$_2$O + Na$_2$O | 5 to 12 |
| K$_2$O | 0 to 5 |
| MgO | 0 to 20 |
| CaO | 0 to 6 |
| with the proviso that MgO + CaO | 4 to 20 |
| SrO + BaO | 0 to 10 |
| ZrO$_2$ | 0 to 5 |
| TiO$_2$ | 0 to 5 |
| CeO$_2$ | 0 to 1 |
| La$_2$O$_3$ | 0 to 10 |
| Fe$_2$O$_3$ | 0 to 10 |
| Nb$_2$O$_5$ | 0 to 10 |
| V$_2$O$_5$ | 0 to 15 |
| with the proviso that TiO$_2$ + ZrO$_2$ + La$_2$O$_3$ + Fe$_2$O$_3$ + Nb$_2$O$_5$ + V$_2$O$_5$ | $\geq 18.7$ |
| As$_2$O$_3$ + Sb$_2$O$_3$ + F | 0.1 to 1, | wherein said glass satisfies the following inequality formulae (1):

$$(E/\rho) \cdot +3{,}500\ R > 38.5 \text{ and } 1000\ R > 1 \tag{1}$$

wherein R represents the relaxation rate of the glass and $E/\rho$ represents specific elasticity modulus of the glass measured in GPA*cm$^3$/g.

6. A method of making a rigid disk substrate for a rigid disk operable at rotation speeds greater than 10,000 rpm, said method comprising the step of making the rigid disk substrate from a glass having the following composition (in % by weight based on oxides):

| | |
|---|---|
| SiO$_2$ | 40 to 50.8 |
| Al$_2$O$_3$ | 5 to 20 |
| B$_2$O$_3$ | 0 to 5 |
| Li$_2$O | 0 to 10 |
| Na$_2$O | 0 to 12 |
| with the proviso that Li$_2$O + Na$_2$O | 5 to 12 |
| K$_2$O | 0 to 5 |
| MgO | 0 to 20 |
| CaO | 0 to 6 |
| with the proviso that MgO + CaO | 4 to 20 |
| SrO + BaO | 0 to 10 |
| ZrO$_2$ | 0 to 5 |
| TiO$_2$ | 0 to 5 |
| CeO$_2$ | 0 to 1 |
| La$_2$O$_3$ | 0 to 10 |
| Fe$_2$O$_3$ | 0 to 10 |
| Nb$_2$O$_5$ | 0 to 10 |
| V$_2$O$_5$ | 0 to 15 |
| with the proviso that TiO$_2$ + ZrO$_2$ + La$_2$O$_3$ + Fe$_2$O$_3$ + Nb$_2$O$_5$ + V$_2$O$_5$ | $\geq 18.7$ |
| As$_2$O$_3$ + Sb$_2$O$_3$ + F | 0.1 to 1, | wherein said glass satisfies the following inequality formulae (1):

$$(E/\rho) \cdot +3{,}500\ R > 38.5 \text{ and } 1000\ R > 1 \tag{1}$$

wherein R represents the relaxation rate of the glass and $E/\rho$ represents specific elasticity modulus of the glass measured in GPA*cm$^3$/g.

* * * * *